Oct. 15, 1968     T. V. WILLIAMS     3,405,433
ROTARY MACHINING TOOL
Filed Sept. 6, 1966
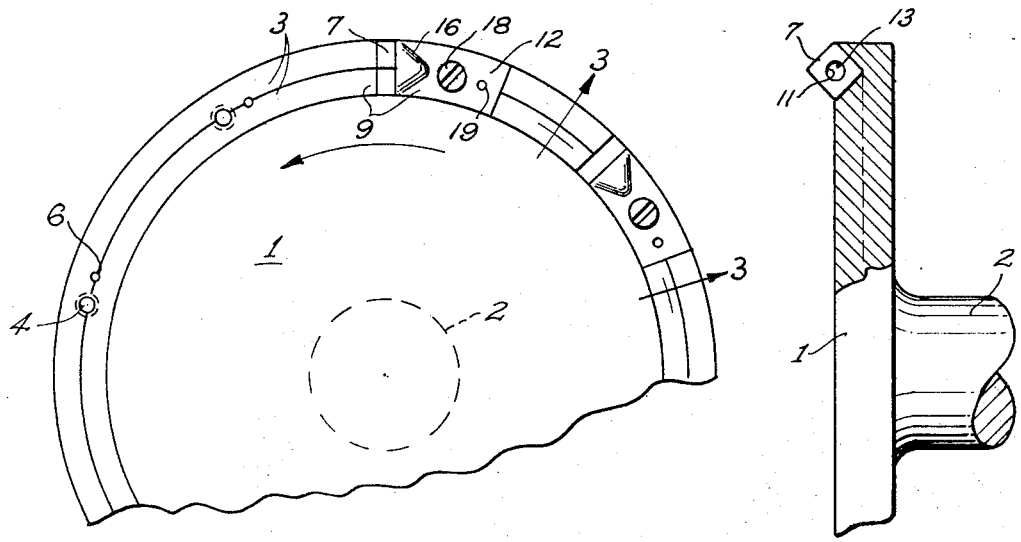
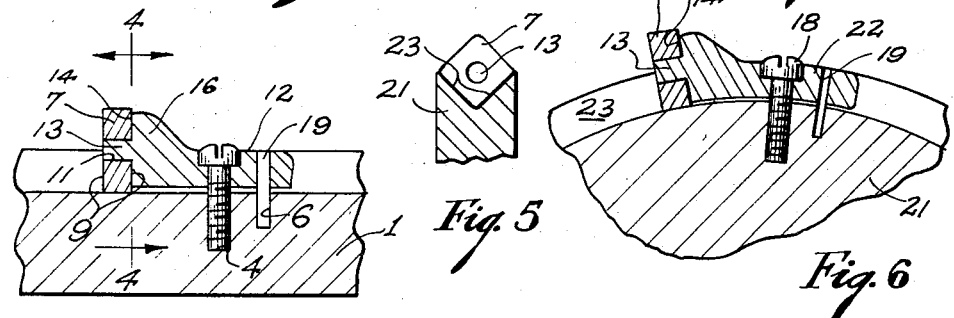
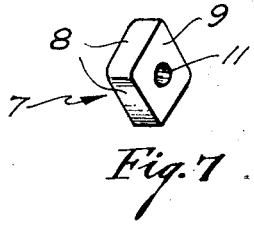
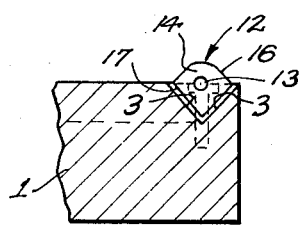
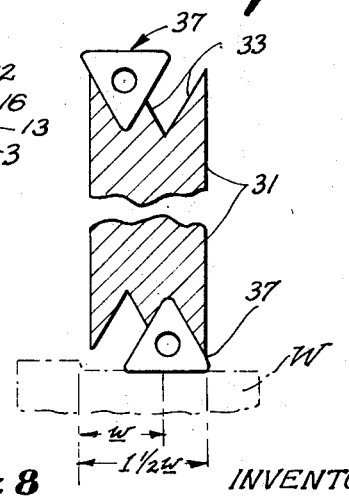
INVENTOR
THURSTON V. WILLIAMS
BY Roberts, Cushman & Grover
ATTORNEYS

United States Patent Office 3,405,433
Patented Oct. 15, 1968

3,405,433
ROTARY MACHINING TOOL
Thurston V. Williams, Wilton, N.H., assignor to The O.K.
Tool Company, Inc., Milford, N.H., a corporation of
New Hampshire
Filed Sept. 6, 1966, Ser. No. 577,430
15 Claims. (Cl. 29—105)

This invention relates to rotary machine tools of the type comprising a rotating carrier such as a wheel and a working element such as a metal-cutting bit carried on the wheel.

One object of the invention is to provide a wheel which is far simpler and more economical to make than prior wheels, and to which a working element is quickly and easily attached. Another object is to provide a way of holding a working element such as a bit on the wheel in various positions allowing different portions of the element to be used. A further object is to provide a wheel which holds two or more like cutting elements axially or radially spaced on the wheel to have a cutting or other working effect on different parts of a workpiece.

According to the invention a rotary tool comprises a rotary carrier with an annular groove, a working element having a working portion, an opposed portion seating in said groove, and an intermediate portion, a holder fitting in said groove and having means engaging the intermediate portion of said element, and means for securing the holder in the groove thereby to clamp the working element therein.

For the purpose of llustration typical embodiments of the invention are shown in the accompanying drawing, in which:

FIG. 1 is an end or axial view of one from of wheel carrying cutting bits and shown partly in section;
FIG. 2 is a side view of the wheel;
FIG. 3 is an enlarged section on line 3—3 of FIG. 1;
FIG. 4 is a section on line 4—4 of FIG. 3;
FIG. 5 is a section like FIG. 2 of a modified form of wheel;
FIG. 6 is a section like FIG. 3 of the wheel of FIG. 5;
FIG. 7 is an isometric view of the cutting bit of FIGS. 1 to 6; and
FIG. 8 is a fragmentary end section like FIG. 2 of another modified form of wheel.

The cutting tool shown in FIGS. 1 to 4 comprises a wheel carried on a shaft 2 extending from one face of the wheel. At the periphery of the other face of the wheel is an annular V groove formed by walls 3 cut axially into the wheel entirely around the wheel concentric with its shaft 2. At equally spaced locations along the groove are tapped holes 4 and pin holes 6. The walls 3 of the groove converge inwardly of the wheel at 90° to receive and seat a rectangular cutting bit 7 having equilateral peripheral edges 8 meeting at right angle corners and joined by faces 9. For metal working such bits are made of extremely hard alloys which are very expensive, brittle and subject to chipping or major fracturing of their bodies unless accurately mounted and braced.

Extending through the faces 9 on the central axis of the bit is a circular opening 11. A bit holder 12 has a round pin 13 protruding from the flat surface 14 on a shoulder 16 at one end. The pin 13 fits cleanly in the bit opening 11 with the flat 14 against the bit wall 9. The holder 12 has under walls 17 converging at the same angle as the groove walls 3 so as to fit loosely in the groove. But the holder pin 13 is spaced closer to the under walls than the bit opening 11 is to the corresponding edges 8 seated in the groove. Consequently there is a clearance of about 0.010 inch between at least the forward (pin) end of the holder under walls 17 and the groove walls 3 when the holder is secured in the groove by a screw 18 in the threaded hole 4 of the groove.

The holder 12 carries a second pin 19 fitting in the radial hole 6 at the bottom of the groove, this fit cooperating with the screw fit to anchor the holder against movement lengthwise of the groove. When the holder is so anchored, the clearance of its under walls allows the pin 13 to clamp on the abutting lower part of the bit opening 11 and jam the bit in the groove. At the same time the shoulder surface 14 which faces the direction of rotation of the wheel backs up the bit against the force with which the exposed edges of the bit engage a workpiece in operation.

Thus each bit on the wheel is not only anchored but also reinforced by the holder. The holder is easily secured or released from the wheel, and because its shoulder surface 14 is covered by the bit it does not interfere with the cutting edges of the bit. Further, the bit may be rotated on the holder pin 13 to expose a fresh cutting surface, because the groove side walls will receive any corner of the bit. And the shoulder surface can oppose either of the bit faces 9 so that all the eight cutting corners on the bit may be used. These advantages are realized with a groove which is simply, accurately and economically formed by a continuous cut on a standard lathe, concentric with the wheel axis. This construction also allows the groove to be simply and accurately ground in the wheel after hardening. It also allows the wheel to be redressed after abuse or wear to the original accuracy of the groove.

These advantages accrue with other forms of bits and grooved wheels. As shown in FIGS. 5 and 6, a peripheral groove 23 can be cut continuously around the outer edge of a wheel 21 to receive the rectangular bit 7 of FIG. 7. A similar holder 22 with a pin 13 and bit-reinforcing surface 14 is secured in the groove by a screw 18 and register pin 19.

Another form of wheel 31 shown in FIG. 8 permits half multiples of cuts to be made with each size of cutting bit. In this form the bits 37 are equilateral triangles and are fitted with a W-shaped groove 33 which is equivalent to two V-shaped grooves overlapping by one-half the width of the bit. Each such bit may be secured by the holder of FIGS. 1 to 4 or of FIGS. 5 and 6 such that the cutting width $w$ in a workpiece W of one bit is combined with the like cutting width of a second bit to provide a total cut of one-and-one-half widths with two single width bits. Because the bits are so expensive as to constitute a substantial portion of the cost of a wheel, and because hitherto a number of btis of each size and half-size had to be stocked, the reduction of stock of one half, by eliminating half-sizes, is a signficant saving.

While certain desirable embodiments of the invention have herein been illustrated and described, it is to be understood that these are mainly by way of example, and the invention is broadly inclusive of any and all modifications falling within the scope of the appended claims.

I claim:
1. A rotary tool comprising
   a rotary carrier with an annular groove concentric with the carrier axis,
   a working element having a working portion, an opposed portion seating in said groove, and an intermediate portion,
   a holder fitting in said groove and having means engaging the intermediate portion of said element,
   and means for securing the holder in the groove thereby to clamp the working element therein.
2. A tool according to claim 1 wherein the holder has a seating portion curved concentrically with the carrier axis and fitting lengthwise in the groove.
3. A tool according to claim 1 wherein the intermediate portion of said element has an abutment and said holder has means engaging the abutment in a direction toward said groove.

4. A tool according to claim 3 wherein the intermediate portion of said element comprises a face and said holder has a shoulder engaging said face to brace the element lengthwise of the groove.

5. A tool according to claim 4 wherein said shoulder is more than covered by said face.

6. A tool according to claim 3 wherein said abutment holds the holder clear of the groove.

7. A tool according to claim 3 wherein said abutment is formed by an opening into the intermediate portion of said element.

8. A tool according to claim 7 wherein said holder has a protuberance extending into the opening.

9. A tool according to claim 1 wherein said groove has sides converging at an angle inwardly of the carrier and said element has peripheral edges mating with said sides.

10. A tool according to claim 9 wherein said element has equilateral peripheral edges meeting at each corner at the same angle as the sides of the groove so that each corner of the elements fits the groove.

11. A tool according to claim 10 wherein said element has a central opening and said holder has a protuberance fitting in said opening with any corner of the element fitting in said groove.

12. A tool according to claim 9 wherein the wheel has a second groove concentric with the first said groove and spaced therefrom less than the length of the sides of elements so that the elements are operative on two portions of a workpiece during each revolution of the wheel.

13. A tool according to claim 12 wherein the grooves are spaced apart less than the width of the working portion of each element so that the elements are operative on overlapping portions of the workpiece.

14. A rotary tool comprising
a wheel having a continuous, annular peripheral groove therearound, said groove having flat side walls converging at an angle inwardly of the wheel,
a cutting bit having a peripheral cutting edge and an opposite peripheral edge adapted to seat in said groove, said peripheral edges being joined by side faces having an opening therethrough normal thereto,
a holder comprising bottom walls meeting at angle to fit in said groove, a surface extending radially of the wheel for engaging either face of said bit, and a pin fitting in said bit opening, and directed along the groove,
a tapped hole extending from the groove radially or axially inwardly of the wheel,
and a screw extending through said holder into said hole for urging the holder into the groove so that the holder pin clamps the bit in the groove with the holder surface backing one of said bit faces.

15. A tool according to claim 14 wherein said wheel has a second groove parallel to the first said groove and spaced therefrom to hold a second bit.

References Cited

UNITED STATES PATENTS

| | | | |
|---|---|---|---|
| 2,914,838 | 12/1959 | Robinson | 29—105 |
| 3,060,554 | 10/1962 | Kirchner | 29—96 |
| 3,289,275 | 12/1966 | Kulson | 29—105 |
| 3,323,192 | 6/1967 | Gustafson | 29—96 |

HARRISON L. HINSON, *Primary Examiner.*